UNITED STATES PATENT OFFICE.

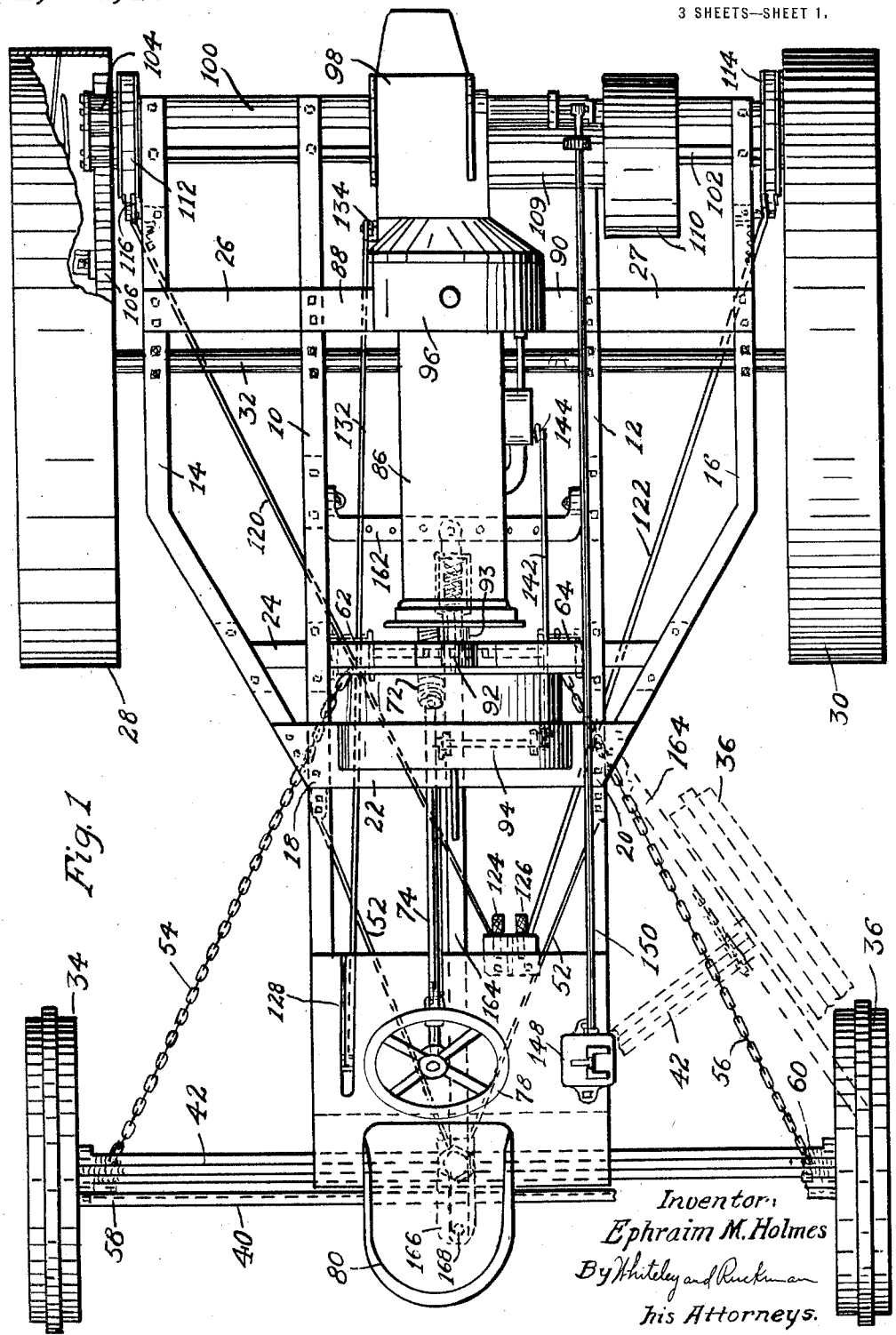

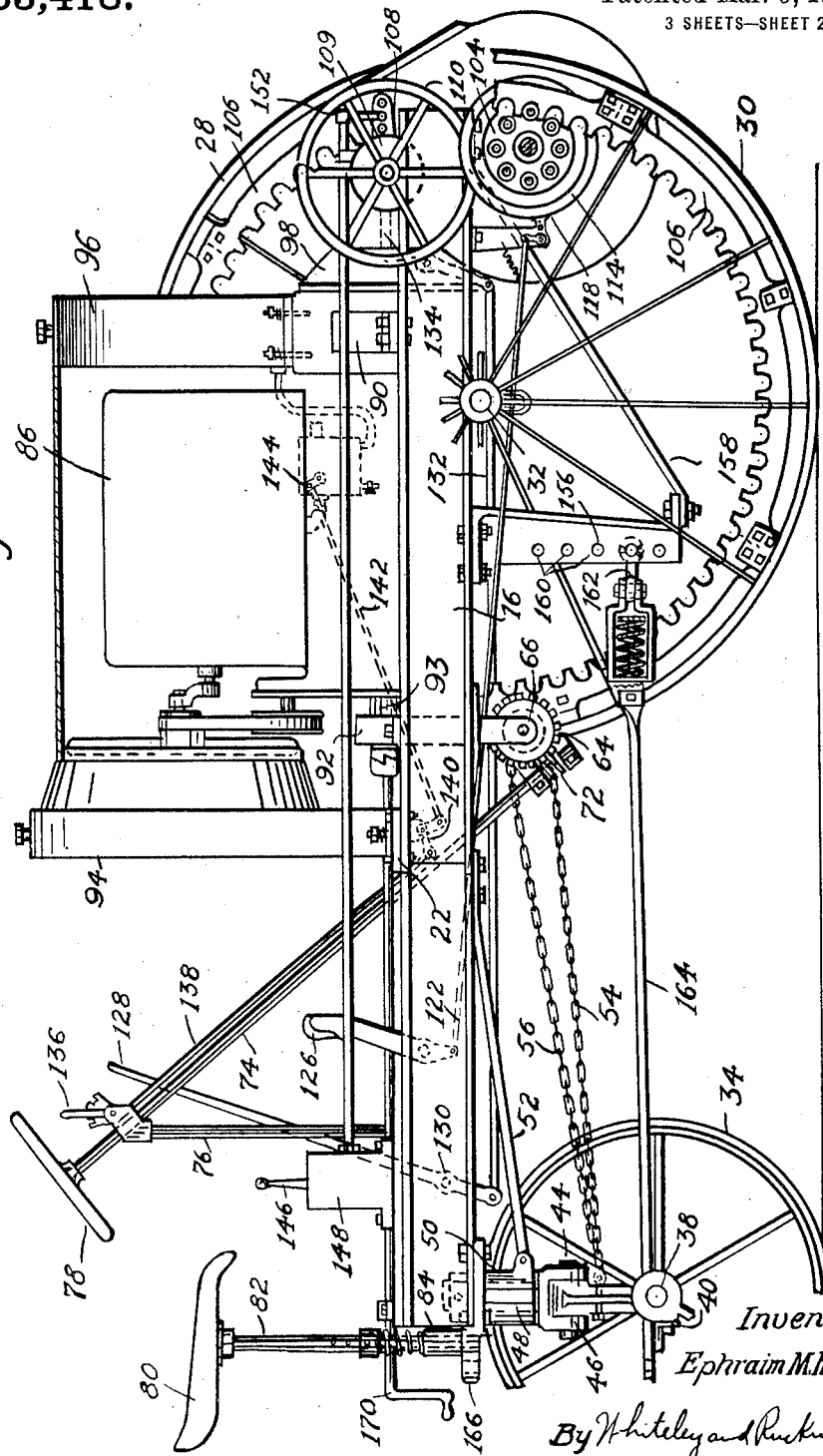

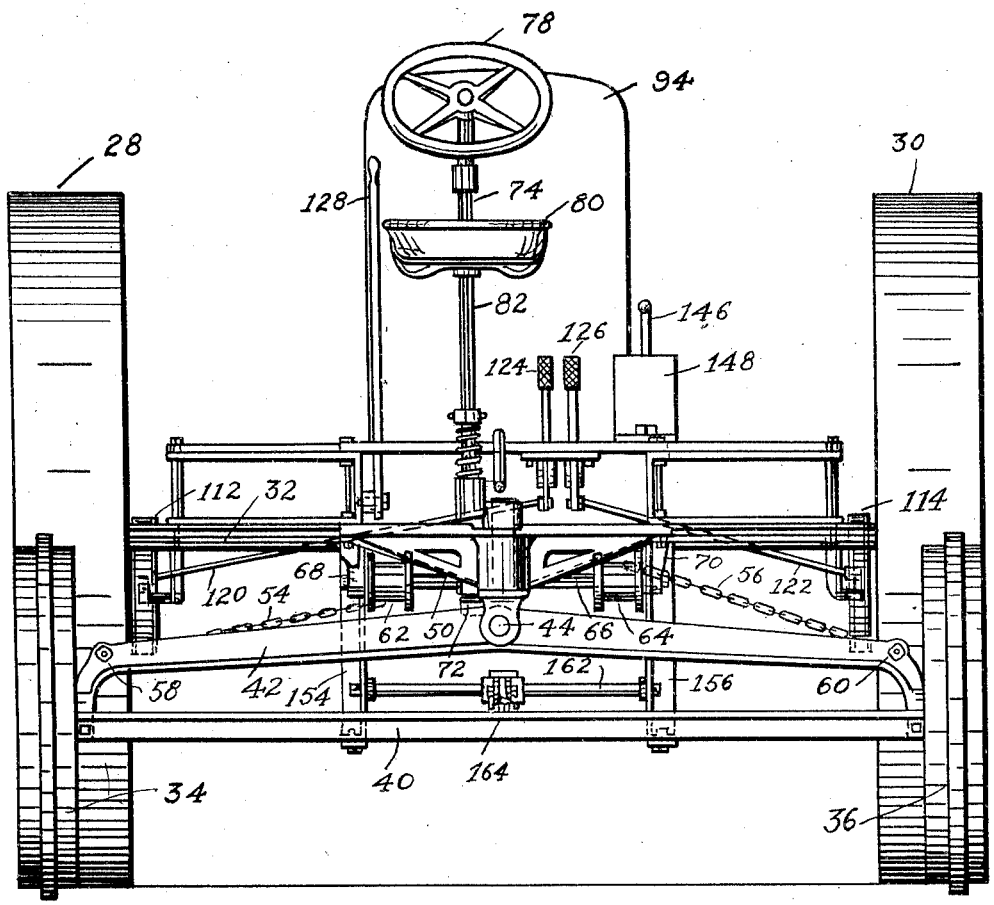

EPHRAIM M. HOLMES, OF MINNEAPOLIS, MINNESOTA, ASSIGNOR TO DANIEL E. FRENCH, OF STUART, FLORIDA.

TRACTOR.

1,333,418.  Specification of Letters Patent.  Patented Mar. 9, 1920.

Original application filed February 23, 1918, Serial No. 218,711. Divided and this application filed February 17, 1919. Serial No. 277,510.

*To all whom it may concern:*

Be it known that I, EPHRAIM M. HOLMES, a citizen of the United States, residing at Minneapolis, in the county of Hennepin and State of Minnesota, have invented certain new and useful Improvements in Tractors, of which the following is a specification.

My invention relates to tractors intended primarily for agricultural work. The present application is a division of application Serial Number 218,711, filed February 23, 1918, and the object of the invention as claimed in the present case is to provide a motor mounting in which the motor is supported on the frame in such manner that straining and racking are avoided when the tractor is operated over rough and ridged ground. I accomplish the objects of my invention by securing the motor at one end rigidly to the frame while at the other end the motor is pivotally or oscillatingly supported at a single central point.

The full objects and advantages of my invention will appear in connection with the detailed description thereof and are particularly pointed out in the claims.

In the drawings, illustrating the application of my invention in one form,—

Figure 1 is a plan view of the tractor showing a few of the parts in section. Fig. 2 is a side elevational view one of the steering wheels being removed and with one of the driving wheels partly broken away. Fig. 3 is a rear elevational view.

In carrying out my invention I provide a frame consisting of two parallel longitudinal beams 10 and 12 and two shorter beams 14 and 16 extending from the front of the frame and having their rear portions bent inwardly and secured to the longitudinal beams at 18 and 20 between the ends of said beams. The longitudinal members 10 and 12 are secured together by transverse frame members 22 and 24, while transverse members 26 and 27 secure the members 10 and 14 and 12 and 16 respectively. The frame is supported at its front by two drive wheels 28 and 30 rotatably mounted on a stationary shaft 32 secured by U-shaped pieces to the longitudinal members 10 and 12 and also secured to the short members 14 and 16. At the rear, the frame is supported by two steering wheels 34 and 36 which are about half the width of the drive wheels 28 and 30. The wheels 34 and 36 are mounted on stub shafts 38 which are secured to a curved bar 42 which is pivotally connected by horizontal pivot 44 to a forked member 46 the upper end of which is rotatably mounted in a vertical bearing 48 carried by a bracket 50 secured to the rear ends of the longitudinal frame members 10 and 12 and strengthened by braces 52. It thus becomes apparent that the frame is supported on four wheels but so far as movement is concerned is supported at three points, namely, at the pivot 44 and at the points where the shaft 32 passes through the hubs of the two drive wheels. The ends of the curved bar 42 are connected by a straight bar 40 which may be removed if desired for a purpose to be referred to later.

For operating the steering wheels, two chains 54 and 56 have their rear ends fastened to the curved bar 42 at 58 and 60 while their forward ends are wound in opposite directions as shown in Fig. 3 around drums 62 and 64 which are secured to a shaft 66 rotatably mounted in bearings formed on brackets 68 and 70 depending from the frame. For turning the shaft in either direction as desired, it is connected by worm gearing 72 with a shaft 74 supported by standard 76 and the shaft 74 has a hand wheel at 78 at its upper end positioned within reach from an operator's seat 80 mounted upon an adjustable spring-supported rod 82 extending into a socket 84 at the rear of the frame.

The motor and transmission system with which my tractor is equipped are mounted toward the front of the frame, as best shown in Fig. 2. The motor, which is preferably an internal combustion engine, is designated by the character 86 and is supported at three points, two of which are at each side of the front thereof as indicated at 88 and 90 on the transverse members 26 and 27, and the third point of which is at the center and rear of the engine. This third point of support is constituted by a bearing 92 on the crossbar 24 into which fits a cylindrical extension 93 on the engine housing capable of turning in the bearing. On account of this method of mounting, the engine is not subjected to straining action when the tractor is operating over rough ground. A radiator and a fuel tank, indicated at 94 and 96, and the other parts common to engines of this type are located as shown in Figs. 1 and 2. The crankshaft of the engine drives the usual transmission device contained in the transmission casing 98 supplied with the customary differential, the differential shafts of which extend in opposite directions through cannon housings 100 and 102 for operating the two drive wheels, the shafts being operatively connected with the drive wheels through gears 104 meshing with internal gears 106 on the driving wheels. A countershaft 108 mounted in a cannon housing 109 has secured on its outer end, a belt pulley 110 for stationary power purposes. The housings 100 and 102 are secured to the front of the frame members and have the additional function of strengthening the frame.

Secured to each of the differential shafts are brake drums 112 and 114 with which brake bands 116 and 118 of ordinary construction are adapted to coöperate. The brake bands may be operated by rods 120 and 122 connected to pedals 124 and 126 within reach of the operator, so that the drive wheels 28 and 30 may be independently braked. The operation of an important feature of my invention is now readily apparent. If, for instance, the brake be applied to the right-hand drive wheels 30, as viewed in Fig. 1, and the hand wheel be operated to swing the steering wheels to the right, then the tractor will swing around the drive wheel 30 as a pivot and either a square turn or a right-about turn can be made. This is a particularly desirable feature in farm tractors.

A clutch lever 128 is pivoted to the frame at 130 and through the rod 132 is adapted to operate the clutch 134 of ordinary construction. A throttle control handle 136 is pivoted to the bearing of the standard 76 and through the rod 138, bell-crank 140 and rod 142 is adapted to control the customary throttle 144. A gear shifter handle 146 is mounted in the quadrant 148 and is secured to one end of a rotatable and longitudinally-movable rod 150, the other end of which is adapted to operate a gear shifter 152 of the usual construction.

Depending from the longitudinal beams 10 and 12 toward the front ends thereof are two bracket members 154 and 156 which are strengthened by braces 158. A series of holes 160 are provided in each of these bracket members and a transverse rod 162 is adjustably positioned in these holes. A drawbar 164 is adjustably and pivotally connected to the bar 162 by means of a series of holes therein. If desired the drawbar 164 and the transverse bar 40 at the rear of the frame can be removed in order to leave the lower portion of the tractor open when used for cultivating. In this case the implement to be drawn may be connected to the lug 166 by means of a drawbar inserted in the hole 168. A starting crank for the engine is shown at 170.

The operation and advantages of my invention will be obvious from the foregoing description. When the tractor passes over rough ground, or whenever there is a tendency in any way for the frame to be lifted more on one side than on the other, the fact that one end of the motor is centrally and pivotally or oscillatingly mounted eliminates the straining and racking which would result when both ends of the motor are rigidly secured to the frame.

I claim:

1. A tractor comprising a frame, a motor, means for securing the front end of said motor rigidly to said frame, means for supporting the rear end of said motor at a single central point on said frame, said last-mentioned means including a horizontal pivotal connection, drive wheels at the front of said frame, driving connections between said motor and said drive wheels, steering wheels at the rear end of said frame, and means for operating said steering wheels.

2. A tractor comprising a frame, a motor, two transverse bars secured to said frame, the front corners of said motor being supported by said transverse bars, a transverse bar secured to said frame adjacent the rear of said motor, a bearing member secured to said transverse bar, a cylindrical member extending from the rear of said motor into said bearing member, drive wheels at the front of said frame, driving connections between said motor and said drive wheels, and steering wheels at the rear end of said frame.

3. A tractor comprising a frame having a substantially rectangular portion formed with longitudinal side members extending from the front to the rear of the tractor and supplemental members outside of said longitudinal members extending longitudinally from the front of the tractor and having their rear portions turned inwardly and secured to said longitudinal members between the ends thereof, a stationary transverse shaft secured to all of said members toward the front ends thereof, drive wheels mounted on the ends of said shafts, two transverse bars secured respectively to the longitudinal supplemental members at two sides of the tractor, a motor secured at its front to said transverse bars, a transverse bar adjacent the rear of said motor secured to said longitudinal members and to the inwardly turned portions of said supplemental members, a bearing member secured to the middle of said transverse bar, a cylindrical member extending from the rear of said motor and rotatably mounted in the said bearing member, driving connections between said connection and said drive wheels, and steering wheels at the rear end of said frame.

In testimony whereof I hereunto affix my signature.

EPHRAIM M. HOLMES.